United States Patent [19]

Shimura

[11] Patent Number: 4,815,078

[45] Date of Patent: Mar. 21, 1989

[54] METHOD OF QUANTIZING PREDICTIVE ERRORS

[75] Inventor: Kazuo Shimura, Kanagawa, Japan

[73] Assignee: Fuji Photo Film Co., Ltd., Kanagawa, Japan

[21] Appl. No.: 33,441

[22] Filed: Mar. 31, 1987

[30] Foreign Application Priority Data

Mar. 31, 1986 [JP] Japan .................................. 60-73809

[51] Int. Cl.[4] ............................................ H04N 7/12
[52] U.S. Cl. ........................................ 371/30; 358/260; 375/26; 382/56
[58] Field of Search ...................... 371/30, 72; 382/56, 382/57; 358/133, 135, 260; 375/26, 27

[56] References Cited

U.S. PATENT DOCUMENTS

| | | | |
|---|---|---|---|
| 4,190,861 | 2/1980 | Lux | 358/135 |
| 4,255,763 | 3/1981 | Maxemchuk et al. | 358/135 |
| 4,325,085 | 4/1982 | Gooch | 358/261 |
| 4,369,463 | 1/1983 | Anastassiou et al. | 358/135 |
| 4,454,546 | 6/1984 | Mori | 358/260 |
| 4,563,671 | 1/1986 | Lim et al. | 340/347 DD |
| 4,706,260 | 11/1987 | Fedelele et al. | 375/27 |

*Primary Examiner*—Charles E. Atkinson
*Attorney, Agent, or Firm*—Sughrue, Mion, Zinn, Macpeak & Seas

[57] ABSTRACT

Predictive errors are grouped into a plurality of quantizing ranges, and the predictive errors in the respective quantizing ranges are represented by representative quantizing values assigned respectively to the quantizing ranges. The predictive error data items in each of the quantizing ranges are processed to provide a weighted mean value based on the frequency distribution thereto. The weighted mean value or a value close thereto is used as a representative quantized value for that quantizing range.

4 Claims, 1 Drawing Sheet

FIG.1
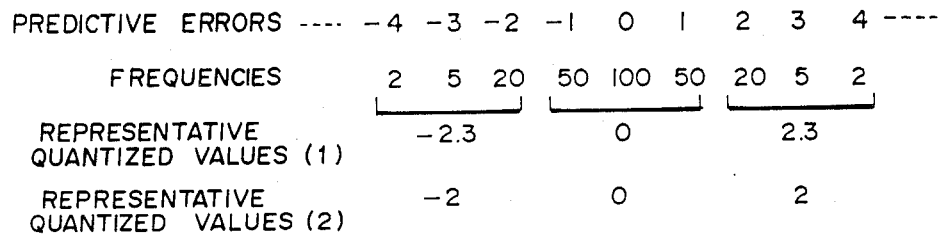
FIG.2(a)     FIG.2(b)
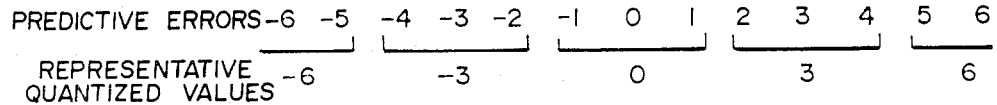
FIG.3(a)
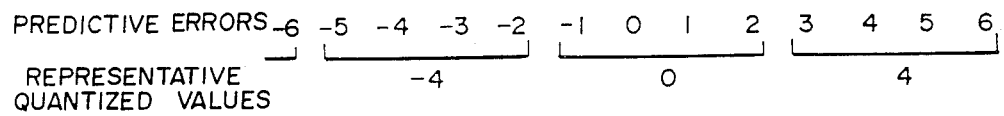
FIG.3(b)

METHOD OF QUANTIZING PREDICTIVE ERRORS

BACKGROUND OF THE INVENTION

1. Field of the Invention

The present invention relates to a method of quantizing predictive errors, and more particularly to a method of quantizing predictive errors which are obtained, for example, when compressing image data having gradations with predictive coding.

2. Description of the Prior Art

Digital image data (digital image signals) stored in a recording medium such as an optical disk is read out so as to be reproduced as a visible image on a CRT or the like, or transmitted over facsimile or the like to a receiver where a visible image may be reproduced from the received image data.

When storing or transmitting the digital image data, it is preferable to reduce the amount of image data because the amount of digital-.image data with gradations is extremely large and it would be highly costly in storing or transmitting such digital image data as it is.

One known method of reducing the amount of image data (i.e., the amount of digital image signals) is predictive coding. The predictive coding is based on the principle that an image data item of interest can be thought of as having a data value similar to that of a nearby image data item. The image data item of interest is predicted in a suitable manner from the nearby image data item, and the difference between the predicted data value and the actual data value, i.e., a predictive error, is determined. Based on the phenomenon that a distribution of such predictive errors is clustered around zero, the predictive errors are coded by variable word length coding (a signal with its word length variable dependent on the value to be coded) such as Huffman coding in which a short code is assigned to predictive errors that are more frequent and a long code is assigned to those which are less frequent. By thus coding the predictive errors, the redundancy of the image data is suppressed thereby to compress the amount of data as a whole.

In the predictive coding process, it is preferable, if allowable in view of the available image quality margin, to code a predictive error after it has been quantized into a rougher range of quantities, rather than to code the predictive error as it is, because the amount of image data can be reduced as much as the predictive error has been quantized into rougher quantities, so that the data compression ratio can be increased. Quantization used herein means that x (original data) having a value in the range of $x_i \leq x \leq x_{i+1}$ is represented by Xi (representative quantized value), or stated otherwise, original data x in a certain quantizing range ($x_i$ to $x_{i+1}$) is replaced with one representative quantized value Xi.

According to conventional quantization, it is general to employ, as a representative quantized value Xi, a median value, expressed below, of original data items $x_i$ to $x_{i+1}$:

$$Xi = \frac{Xi + x_{i+1}}{2}$$

as shown in FIG. 3(a), or a suitable value close to the median value (an integral value close to the median value), as shown in FIG. 3(b). However, such conventional quantization may not be used as quantization for predictive errors for the reasons given below.

As described above, predictive errors are not uniformly distributed but clustered around zero, and hence the sum (hereinafter referred to as a "quantization error") of the differences between the median value and the respective original data items (predictive error data items) in the quantizing range becomes greater. Therefore, the median value is no longer used as a value representative of each original data item in the quantizing range, with the result that the image quality will be more degraded by quantization than possible with an optimum representative quantized value.

SUMMARY OF THE INVENTION

It is an object of the present invention to provide a method of quantizing a predictive error, the method being capable of establishing a representative quantized value in order to minimize the predictive error, and, consequently, of minimizing any degradation of image quality arising from quantization.

To accomplish the above object, predictive errors (original data items, i.e., data items to be quantized) are grouped into a plurality of quantizing ranges, the predictive errors in the respective quantizing ranges are represented by representative quantizing values (quantized data items) assigned respectively to the quantizing ranges. In doing so, the predictive error data items in each of the quantizing ranges are processed to provide a weighted mean value based on the frequency distribution thereof, and the weighted mean value or a value close thereto is used as a representative quantized value for that quantizing range.

The method according to the present invention is based on the fact that predictive errors have a frequency distribution clustered highly around zero, and a representative quantized value is selected to be a weighted mean value based on the frequency distribution or a value close thereto, rather than a median value, so that the predictive errors are minimized for minimum image quality deterioration.

The method of the present invention is not limited to predictive errors in image data, but may be applied to predictive errors having a deviating frequency distribution.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a diagram explanating a quantizing method according to an embodiment of the present invention;

FIGS. 2(a) and 2(b) are diagrams explanating predictive errors produced by prediction based on previous data values; and FIGS. 3(a) and 3(b) are diagrams explanatory of a conventional quantizing method.

DESCRIPTION OF THE PREFERRED EMBODIMENT

In an embodiment of the present invention which will be described below, predictive errors produced when compressing radiation image data with predictive coding are quantized.

The term "radiation image data" used herein is data of an image formed by radiation that has passed through an object such as a human being, and refers to data of a radiation image produced in a radiation image information recording and reproducing system employing a stimulable phosphor sheet for which the applicant has filed many patent applications (see, for example, Japanese Patent Publication Nos. 55(1980)-11429, 56(1981)-11395, and 55(1980)-163472), or in an X-ray photographic system employing conventional silversalt photography.

First, predictive errors to be quantized will be described below. For predictive coding, it is necessary to obtain predictive errors at first. Various methods are available for obtaining predictive errors. In this embodiment, predictive errors produced by prediction based on previous values will be described.

In such prediction, a certain image data value of interest is predicted as being the same as an image data value that is positioned before the image data value of interest. The difference between the predicted image data value (the previously positioned image data value) and the actual image data value of interest is used as a predictive error. For example, when processing image data items $a_{11}, a_{12}, \ldots, a_{21}, a_{22}, \ldots, a_{31}, a_{32}, \ldots$ as shown in FIG. 2(a) according to prediction on previous values to produce predictive errors $\Delta a_{12}, a_{13}, \ldots, \Delta a_{22}, \Delta a_{23}, \ldots, \Delta a_{32}, \Delta a_{33}, \ldots$, as shown in FIG. 2(b), these predictive errors are determined as follows:

$\Delta a_{12} = a_{12} - a_{11}, \Delta a_{13} = a_{13} - a_{12}, \ldots$ $\Delta a_{22} = a_{22} - a_{21}, \Delta a_{23} = a_{23} - a_{22}, \ldots$ $\Delta a_{32} = a_{32} - a_{31}, \Delta a_{33} = a_{33} - a_{32}, \ldots$ The image data items at the beginning ends of the respective lines $L_1, L_2, L_3, \ldots$ are employed as they are. Each of the square areas shown in FIGS. 2(a) and 2(b) corresponds to one pixel.

The predictive errors thus determined have a frequency distribution clustered highly around zero, as described above.

The method of the invention for quantizing such predictive errors will be described below.

FIG. 1 shows predictive errors in its uppermost row, predictive error frequencies in the second row, representative quantized values in the third row which are quantized by the method of the invention, and other representative quantized values in the fourth row which are quantized by the method of the invention.

According to the quantizing method of the invention, predictive errors are grouped into a plurality of quantizing ranges based on their magnitudes, the predictive error data items in each of the quantizing ranges are processed to provide a weighted mean value based on the frequency distribution thereof, the weighted mean value or a value close thereto being used as a representative quantized value for that quantizing range, and the predictive errors in each of the quantizing ranges are represented by, or replaced with, the representative quantized value thus obtained.

The representative quantized value can be expressed by the following equation:

$$Xi = \frac{\int_{x_i}^{x_{i+1}} f(x) \cdot x \, dx}{\int_{x_i}^{x_{i+1}} f(x) \, dx} \quad (I)$$

where $x$ ... predictive error
$f(x)$ ... frequency of predictive error $x$
$x_i$-$x_{i+1}$ ... quantizing range
$Xi$ ... representative quantized value The quantizing process of the invention will be described with reference to the example shown in FIG. 1. The predictive errors are divided into quantizing ranges by grouping three levels such as $(-4, -3, -2), (-1, 0, 1), (2, 3, 4), \ldots$, and representative quantized values for the respective quantizing ranges are determined by the equation (I) above. For example, for the quantizing range (2, 3, 4), the representative quantized value is determined as follows:

$$Xi = \frac{(20 \times 2) + (5 \times 3) + (2 \times 4)}{20 + 5 + 2} \approx 2.3$$

The representative quantized values for the other quantizing ranges are determined in the same manner. The predictive errors in the quantizing ranges are represented by the representative quantized values (indicated at (1) in FIG. 1) thus obtained.

Representative quantized values are not necessarily weighted mean values based on the frequency distribution, but may be values closed to the weighted mean values, for example, integral values close to the mean values, which can easily be coded at a subsequent coding stage. Representative quantized values thus established are indicated as representative quantized values (2) in FIG. 1.

The values close to the weighted mean values based on the frequency distribution signify at least values which are closer to the mean values than the median values of the quantizing values.

The frequency distribution may be an actual calculated frequency distribution of total predictive errors. However, instead of actually calculating such a frequency distribution, a frequency distribution of a suitable pattern may be selected from several frequency distribution patterns which have been given on the basis of information about an image to be handled, and such a selected frequency distribution may be used. Since frequency distribution patterns are determined to some extent by the kinds of images to be handled, if it is known that the image are radiation images, then a frequency distribution previously given for radiation images can be extracted from the radiation image information for use. In the presence of additional information as to an area of the object to be photographed, such as the chest or head of the object, a frequency distribution having a pattern close to an actual frequency distribution can be employed.

Where the quantizing method of the invention is applied to predictive errors of image data, quantizing characteristics may be established which are optimum for a certain image group, each image, or each segmental image.

The quantizing method of the invention is applicable to analog-to-digital conversion or digital-to-digital conversion. For analog-to-digital conversion, analog signals may be quantized by an A/D converter having the above quantizing characteristics. For digital-to-digital digital conversion, quantization may be effected using a quantizing table having the above quantizing characteristics.

With the quantizing method of the invention, as described above, the median value of predictive errors in a quantizing range is not used as a representative quantized value, but a weighted mean value based on a frequency distribution is employed as a representative quantized value. Therefore, quantization errors can be minimized when predictive errors having a highly deviating frequency distribution are quantized.

Where predictive errors to be quantized are predictive errors obtained when compressing image data with predictive coding, the degradation of image quality can be minimized by minimizing quantization errors at the time quantized data is compressed by coding and then expanded for image reproduction.

Although a certain preferred embodiment has been shown and described, it should be understood that many changes and modifications may be made therein without departing from the scope of the appended claim.

I claim:

1. A method of compressing digital image data to be stored or transmitted, the digital image data representing the image information at corresponding pixels of an image, comprising the steps of:
   determining for each pixel a predicted image data value,
   determining for each predicted image data value a predictive error value;
   assigning the predictive error values to groups, each group consisting of a selected plurality of predictive error values;
   determining the frequency of occurrence of each predictive error value in each of said groups;
   determining a weighted mean value for the predictive error values in each of said groups based on the predictive error values and their frequencies; and
   selecting the weighted mean value of the group for each predictive error value within the group as the representative quantized predictive error value of the corresponding pixel.

2. The method of compressing digital image data as claimed in claim 1 wherein said step of determining a weighted mean value comprises the steps of calculating a weighted mean value based on the frequency distribution of the predictive error values within the group, determining if the calculated weighted mean value is an integer, and selecting as the weighted mean value of the group the calculated weighted mean value when it is an integer and an integer which is close to the calculated weighted mean value when it is not an integer.

3. The method of compressing digital image data as claimed in claim 1 wherein said step of determining a weighted mean value comprises the steps of calculating a weighted mean value based on the frequency distribution of the predictive error values within the group according to the equation:

$$Xi = \frac{\int_{x_i}^{x_{i+1}} f(x) \cdot x \, dx}{\int_{x_i}^{x_{i+1}} f(x) \cdot dx}$$

where:
  $x$ = predictive error
  $f(x)$ = frequency of predictive error $x$
  $x_i - x_{1+i}$ = quantizing range of G group
  $Xi$ = representative quantized predictive error value (weighted mean value).

4. A method of compressing digital image data values corresponding to the image information of pixels comprising an image, comprising the steps of:
   determining for each of said pixels a predictive error value corresponding to the difference between the actual image data value and a predicted image value for the pixel;
   grouping the predictive error values in a plurality of groups according to quantizing ranges;
   determining the frequency distribution of each of the predictive error values in the groups;
   calculating a weighted mean value for each group of predictive error values according to the frequency distribution; and
   outputting for each pixel the calculated weighted mean value of the group comprising the corresponding predictive error value of the pixel.

* * * * *